United States Patent
Reeb et al.

(10) Patent No.: US 11,203,056 B2
(45) Date of Patent: Dec. 21, 2021

(54) METHOD AND DEVICE FOR THE IMPACT TREATMENT OF TRANSITION RADII OF A CRANKSHAFT

(71) Applicant: MASCHINENFABRIK ALFING KESSLER GMBH, Aalen (DE)

(72) Inventors: Alfons Reeb, Aalen (DE); Jochen Schmidt, Boebingen a.d. Rems (DE); Konrad Grimm, Aalen (DE)

(73) Assignee: MASCHINENFABRIK ALFING KESSLER GMBH

( * ) Notice: Subject to any disclaimer, the term of this patent is extended or adjusted under 35 U.S.C. 154(b) by 29 days.

(21) Appl. No.: 16/622,728

(22) PCT Filed: May 24, 2018

(86) PCT No.: PCT/EP2018/063698
§ 371 (c)(1),
(2) Date: Dec. 13, 2019

(87) PCT Pub. No.: WO2018/228799
PCT Pub. Date: Dec. 20, 2018

(65) Prior Publication Data
US 2021/0138532 A1 May 13, 2021

(30) Foreign Application Priority Data
Jun. 14, 2017 (DE) .......................... 102017113078.0

(51) Int. Cl.
*B21K 1/08* (2006.01)
(52) U.S. Cl.
CPC ..................................... *B21K 1/08* (2013.01)

(58) Field of Classification Search
CPC ... B21H 7/185; B21K 1/08; B23P 9/04; B23P 2700/07; B24B 1/04; B24B 5/42;
(Continued)

(56) References Cited

U.S. PATENT DOCUMENTS

| 4,682,489 A | 7/1987 | Bauerle et al. |
| 6,160,248 A | 12/2000 | Ottenwaelder et al. |

(Continued)

FOREIGN PATENT DOCUMENTS

| DE | 3438742 C2 | 3/1988 |
| DE | 102006058710 | 6/2008 |

(Continued)

OTHER PUBLICATIONS

Machine Translation DE-102006058710-A1 (Year: 2008).*
Machine Translation for DE-102006058710-A1 (Year: 2008).*

*Primary Examiner* — Christopher J Besler
*Assistant Examiner* — Christine Bersabal
(74) *Attorney, Agent, or Firm* — Burr & Forman LLP; Harvey S. Kauget

(57) ABSTRACT

The invention relates to a device for the impact treatment of transition radii (8) of a crankshaft (4), in particular transition radii (8) between connecting rod bearing journals (5) and crank webs (7) and/or transition radii (8) between main bearing journals (6) and the crank webs (7) of the crankshaft (4). The device comprises an impact device (1) in order to introduce an impact force (FS) into at least one transition radius (8), wherein the impact device (1) has multiple impact heads (21) which are paired with the same transition radius (8).

5 Claims, 7 Drawing Sheets

(58) Field of Classification Search
CPC .......... B24B 39/045; C21D 7/04; C21D 9/30; C21D 11/00; Y10T 29/49286; Y10T 29/49863
See application file for complete search history.

(56) References Cited

U.S. PATENT DOCUMENTS 8,011,096 B2    9/2011  Reeb et al.
9,015,939 B2 *  4/2015  Reeb ................. B24B 39/04
                                                      29/888.08

FOREIGN PATENT DOCUMENTS

| | | | |
|---|---|---|---|
| DE | 102006058710 A1 * | 6/2008 | ........... B24B 39/045 |
| DE | 102007028888 | 1/2009 | |
| EP | 0788419 | 8/1997 | |
| EP | 1034314 | 9/2000 | |
| EP | 1479480 | 11/2004 | |
| EP | 1612290 | 1/2006 | |
| EP | 1716260 | 11/2006 | |
| JP | S60127928 | 8/1985 | |
| JP | 2010077518 | 8/2010 | |

\* cited by examiner

METHOD AND DEVICE FOR THE IMPACT TREATMENT OF TRANSITION RADII OF A CRANKSHAFT

BACKGROUND OF THE INVENTION

The invention relates to an apparatus for the impact hardening of transition radii of a crankshaft, in particular of transition radii between connecting-rod bearing journals and crank webs and/or transition radii between main bearing journals and the crank webs of the crankshaft, as per the preamble of claim 1.

The invention also relates to a method for the impact hardening of transition radii of a crankshaft.

The invention also relates to a crankshaft.

Owing to the continuously progressing development and increasing performance of internal combustion engines and emissions requirements placed on these, modern engines are consequently subjected to ever greater loading. For this reason, the motor industry places high demands with regard to strength inter alia on the crankshaft, which is subjected to high loading and which is important for the function of an internal combustion engine. Here, in terms of construction, there is often the demand for the crankshaft to be of low weight and for the space requirement to be small. For the design of the crankshaft, this means that an increase in the load capacity should be achieved not by increasing the cross section, that is to say by means of the section modulus of the crankshaft, but as far as possible by means of local internal compressive stress states. For this reason, modern crankshafts are produced using a wide variety of machining and heat treatment methods, such that the crankshafts can be subjected to increasingly higher levels of engine power.

Examples of such methods are thermal treatments, such as the surface hardening methods of induction and case hardening, laser hardening or nitriding, and strain hardening methods, such as deep rolling, shot peening or impact hardening. These are common and for the most part well-established methods, which are suitable for a wide variety of purposes.

With regard to examples of such methods, reference is made to the following documents: EP 1 479 480 A1, EP 0 788 419 B1, EP 1 612 290 A1, DE 10 2007 028 888 A1 and EP 1 034 314 B1.

Impact hardening in particular is an advantageous method for increasing the fatigue strength, in particular the bending fatigue strength and the torsional fatigue strength, of crankshafts. The increase in the fatigue strength is achieved here by virtue of impact forces being introduced into the crankshaft by cold working, preferably hammering by means of special impact tools, in the loaded regions at transitions in cross section and changes in cross section. As examples for such a process, reference is made to DE 34 38 742 C2 and EP 1 716 260 B1.

The present invention is based on the object of further developing the methods and apparatuses for impact hardening in order to further improve the fatigue strength of crankshafts.

Said object is achieved by means of the features specified in claim 1.

Finally, the invention is also based on the object of providing a crankshaft which is improved, in particular with regard to its fatigue strength.

SUMMARY OF THE INVENTION

The dependent claims and the features described below relate to advantageous embodiments and variants of the invention.

The apparatus according to the invention for impact hardening of transition radii of a crankshaft, in particular of transition radii between connecting-rod bearing journals and crank webs and/or transition radii between main bearing journals and the crank webs of the crankshaft, comprises at least one impact device for introducing an impact force into at least one transition radius.

It is thus also possible for more than one impact device, for example two impact devices, three impact devices or four impact devices, to be provided for introducing the impact force into at least one transition radius. Here, the impact devices may be of different design, and it may in particular suffice for one impact device to be designed in accordance with the invention. It is also possible for two, multiple or all impact devices to be designed in accordance with the invention.

The connecting-rod bearing journals and the main bearing journals will hereinafter in some cases also be referred to merely as "journals" for simplicity. Here, the expression "journals" may refer both to the connecting-rod bearing journals and to the main bearing journals, and also only to the connecting-rod bearing journals or only to the main bearing journals. Unless explicitly stated otherwise, all three variants are encompassed by the expression "journals" here.

The invention is particularly preferably suitable for increasing the fatigue strength of, for example, crankshafts with a length of 0.2 to 8 m or more and/or main and connecting-rod bearing journal diameters of 30 to 500 mm or more. The invention is however very particularly preferably suitable for increasing the fatigue strength of large crankshafts with a length of 1.5 to 8 m or more and/or main and connecting-rod bearing journal diameters of 100 to 500 mm or more.

The crankshaft may have various types of transition radii, for example fillets, for example in a basket arch shape, or also undercut radii or radii with transitions. The transition radii may for example transition tangentially into the bearing journal points or running surfaces of the main and connecting-rod bearing journals.

This also applies for transitions to flanges, journals and other geometrical changes in cross section both for tangential and undercut radii.

The crankshaft commonly has transition radii at all transitions or changes in cross section. This applies in particular to changes in cross section between bearing journals and crank webs. The invention is particularly suitable for these. Transition radii may however also be provided for any other changes in cross section, in particular for changes in cross section at the end sections of the crankshaft, in particular at a transition to a flange, a disk or a shaft etc. A transition radius whose fatigue strength is to be improved by means of the method according to the invention and/or the apparatus according to the invention thus need not imperatively be present between a connecting-rod bearing journal and a crank web or a main bearing journal and a crank web, but may rather be arranged at any location of the crankshaft. The expressions "connecting-rod bearing journal", "main bearing journal", "flange", "journal" and/or "crank web" may be reinterpreted accordingly by a person skilled in the art.

The invention will be described below substantially on the basis of the hardening of transition radii between connecting-rod bearing journals and crank webs and/or main bearing journals and crank webs. This is however not to be understood as limiting, and is intended to serve merely for improved understanding or improved readability. Where reference is made to a transition radius in the context of the invention, this may basically be any transition radius at any location of the crankshaft.

According to the invention, the impact device has multiple impact heads which are assigned to the same transition radius.

The introduction of an impact force can be understood to mean that an impact head of the impact device, or a so-called "header" of the impact device, impacts against that region of the crankshaft which is to be hardened, in the present case a transition radius. Here, the impact is performed in targeted fashion at the desired impact position along the transition radius running in annularly encircling fashion around the journal.

By virtue of the fact that the impact hardening of a transition radius is performed by means of multiple impact heads, it is possible for the extent and depth effect of the internal compressive stresses to be predefined in targeted fashion. The solution according to the invention thus makes it possible for the impact force to be introduced with any desired "width" and/or intensity, preferably also in staggered fashion one behind the other, along the circumference of the transition radius.

The methods and apparatuses according to the prior art provide that, in the impact hardening of a transition radius, the impact force is introduced into a transition radius by means of a single impact head. It is thus possible to vary only the size of the impact head, wherein the size of the impact head is in this case firstly restricted by the size of the transition radius, and a decrease in the size of the impact head simultaneously leads to a changed depth effect of the impact hardening. That is to say, according to the prior art, it is not possible to arbitrarily vary the extent of the impact hardening, or the width of the region in which internal compressive stresses are to be introduced, without simultaneously influencing the depth effect. With the use of the solution according to the invention, this relationship can be eliminated through the use of multiple impact heads. The flexibility is thus increased, and the internal compressive stresses can be introduced in even more targeted fashion.

In this way, the crankshaft can possibly be even better adapted to the operation of the engine. Not least, it is furthermore possible for the fatigue strength of the crankshaft to even be increased yet further—proceeding from the present possibilities in the prior art—should this be necessary.

The method according to the invention and the apparatus according to the invention may also be applied or used in the case of crankshafts which have already been machined beforehand using other methods in order to increase the fatigue strength characteristics thereof. For example, a crankshaft that has been hardened by induction hardening can retroactively also be improved with regard to its bending and torsional fatigue strength by means of an introduction of internal compressive stresses using the apparatus according to the invention or the method according to the invention.

An embodiment of the impact device with multiple impact heads which are assigned to the same transition radius can be achieved in various ways. For example, it is possible for the impact device to have two or more impact tools which have in each case one impact head and which are assigned to the same transition radius.

In one refinement of the invention, provision may also be made whereby the impact device has at least one impact tool with multiple impact heads.

Provision may be made in particular whereby the impact device has two impact tools, wherein each impact tool is assigned to one transition radius, and wherein at least one of the impact tools has a multiplicity of impact heads which are assigned to the corresponding transition radius.

It is also possible for the impact device to have a pair of impact tools, wherein each impact tool is assigned to one transition radius. The two impact tools of an impact tool pair may in this case have in each case two or more impact heads. Provision may also be made whereby only one of the impact tools has two or more impact heads, whereas the other impact tool of the impact tool pair has only one impact head.

In one refinement, provision may furthermore be made whereby the impact device has an impact piston and a deflecting unit, wherein the at least one impact tool is arranged at the deflecting unit, and wherein the impact piston transmits an impulse to the at least one impact tool via the deflecting unit, and the one or more impact heads of the at least one impact tool introduce(s) the impact force into the associated transition radius.

For this purpose, an impact piston may be used which transmits an intense pulse or an impulse (generated for example pneumatically, hydraulically and/or electrically) to the impact head.

Depending on the impact force, visible impact impressions of the impact head are formed at the respective impact positions. The depth of the impact impressions and the quality or the depth effect of the introduced internal compressive stresses are in this case dependent on the selected impact force. The tool and the process parameters are preferably exactly coordinated with the respective crankshaft and, here, if appropriate, with partial geometrical changes (changes in cross section).

The impact force in turn can, through variation of the impact angle, be individually set or aligned even more exactly to or with the loading maximum.

It should be understood that, where a part of the description refers to "an impact head/impact tool" or "an impact device" or "multiple impact heads/impact tools/impact devices", this may basically mean any number of impact heads/impact tools/impact devices, for example two, three, four, five, six, seven, eight, nine, ten or more. The reference to a plurality or singularity is provided merely for the sake of better readability, and is not limiting.

Provision may be made whereby two impact tools are used in a common impact device, which impact tools preferably introduce impact forces simultaneously into both transition radii of a connecting-rod bearing journal or of a main bearing journal.

This also applies for transitions to flanges, journals and other geometrical changes in cross section—both for tangential and undercut radii.

The impact tools may preferably be operated by a common impact piston.

In the case of multiple impact tools (and/or impact devices) being used, a common pressure pulse device may be provided which is capable of generating the corresponding impact forces for the impact tools by hydraulic, pneumatic, mechanical and/or electrical means (jointly or individually) for the impact tools.

In one refinement of the invention, provision may also be made whereby the impact device has multiple impact tools, wherein the impact heads of at least two impact tools are assigned to the same transition radius.

Provision may be made here whereby at least two or multiple or all of the impact tools that are assigned to the same transition radius have in each case one impact head. Alternatively, provision may also be made whereby at least two, multiple or all impact tools that are assigned to the same transition radius each have multiple impact heads. Mixed forms are also possible here, that is to say at least one impact tool has one impact head and at least one impact tool assigned to the same transition radius has two or more impact heads.

Provision may thus for example also be made whereby an impact device has multiple impact tools with in each case only one impact head, which are however assigned to the same transition radius. It is also possible for the impact device to have multiple impact tools with in each case only one impact head, wherein a further impact tool with multiple impact heads is provided. Any compositions or combinations are possible. A configuration may also be dependent on the demands on the crankshaft.

It is thus possible for the apparatus according to the invention to be correspondingly adapted to the demands of the crankshaft and/or the demands on the strength of the transition radii, wherein a large number of configuration possibilities exists.

In one refinement of the invention, provision may be made whereby the impact heads are arranged such that the impact heads are arranged offset one behind the other and/or offset adjacent to one another during the impact hardening of a transition radius running in annularly encircling fashion around the connecting-rod bearing journal and/or the main bearing journal.

By means of a lateral offset or by means of an arrangement of impact heads offset adjacent to one another, the "width" over which internal compressive stresses are introduced into the transition radius along the circumference of the transition radius can be varied by means of the number of impact heads used.

If the impact heads are arranged offset one behind the other, the machining duration and/or the machining effect or the depth effect of the machining process can be improved. It is furthermore possible for the impacts to be introduced in staggered fashion one behind the other, possibly with different intensity.

In one refinement of the invention, provision may in particular be made whereby at least two impact heads, preferably all impact heads assigned to the same transition radius, are arranged such that the impact heads each generate their own tracks of impact impressions during the impact hardening of a transition radius running in annularly encircling fashion around the connecting-rod bearing journal and/or the main bearing journal.

Finally, in one refinement, provision may be made whereby the tracks overlap.

In particular by means of overlapping tracks of impact impressions along the circumference of the transition radius and/or along the transition radius running in annularly encircling fashion around the connecting-rod bearing journal and/or the main bearing journal, the hardening effect can be particularly positively influenced.

In one refinement of the invention, provision may furthermore be made whereby at least two impact heads, preferably all impact heads assigned to the same transition radius, are arranged such that the impact heads generate tracks, situated in each case one inside the other, of impact impressions during the impact hardening of a transition radius running in annularly encircling fashion around the connecting-rod bearing journal and/or the main bearing journal.

For example, a first track of impact impressions with a large width along the circumference of the transition radius may be provided, in which there runs a second track of impact impressions with a relatively small width. In this way, the depth of the internal compressive stresses that are introduced can possibly be improved.

Alternatively, the tracks caused by the different impact heads may each also have an identical width, whereby staggered impact hardening can be realized, whereby it is possible to achieve different effects than if the impact hardening were performed only by means of a single impact head and thus by means of one single impact.

In one refinement of the invention, provision may furthermore be made whereby the impact heads for the impact hardening have a spherical surface.

The impact head may preferably be of substantially spherical form, in particular in the front region or at the front end of the impact head, which impacts against the crankshaft for the purposes of hardening. The impact head may however basically have any desired geometry, and may for example also be of oval, hemispherical or flat form.

In one refinement of the invention, provision may be made whereby the impact heads have different sizes.

For example, provision may be made whereby an impact head has a radius whose size amounts to 75% to 99% of the transition radius, preferably 85% to 98% of the transition radius and particularly preferably 85% to 95% of the transition radius.

The radius of the impact head may however also be less than 75% of the transition radius or greater than 95% of the transition radius. The radius of the impact head may also correspond to the transition radius.

The size of the impact head may possibly be dependent on the number of impact heads used per transition radius. It is basically the case that smaller impact heads are preferred the greater the number of impact heads are used per transition radius. If for example two impact heads are provided for one transition radius, an impact head may for example have a radius whose size amounts to 30% to 49% of the transition radius, preferably 40% to 48% of the transition radius and very particularly preferably 40% to 45% of the transition radius. If for example three impact heads are provided for one transition radius, an impact head may for example have a radius whose size amounts to 10% to 33% of the transition radius, preferably 20% to 30% of the transition radius and very particularly preferably 20% to 25% of the transition radius.

According to the invention, provision may also be made whereby the impact heads assigned to the same transition radius are in each case of identical size.

It is also possible that, in the case of an arrangement of the impact heads one behind the other and/or adjacent to one another, the impact heads have different sizes. In the case of an arrangement one behind the other, provision may for example be made whereby the impact head situated at the front in the direction of movement is designed to be larger than the impact heads situated behind. In the case of an arrangement adjacent to one another, it is for example possible for the central impact head to be designed to be larger than the two outer impact heads—or vice versa. Here, any variants may be realized in order to vary the impact impressions and/or the introduced impact force.

In one particular embodiment of the invention, provision may be made whereby the apparatus is configured to adjust the spacing between a deflection point of the deflecting unit and the front end of the one impact head or of the multiple impact heads of an impact tool.

The deflection point may be the central point of the deflecting unit and/or the axis of rotation/mounting of the impact tool or of the impact tools.

The front end of the impact head means that part (or that surface) of the impact head with which the impact head impacts against the crankshaft for the purposes of impact hardening.

By means of the spacing between the deflection point and the front end of the impact head, it is also possible to adjust the spacing between the deflection point and the central point of the impact head or the spacing between the deflection point and the rear end of the impact head.

By virtue of the fact that the spacing between the deflection point of the deflecting unit and the impact head(s) of an impact tool is adjustable, the angle at which the impact force is introduced into the transition radius can be varied or adjusted. Preferably, the angle is selected such that the impact force is introduced at an angle which is exactly adapted to the most highly loaded point, or the loading maximum, during the operation of the crankshaft.

The adjustment of the impact angle, that is to say the orientation with which the impact tool runs from the deflection point to the transition radius, makes it possible to vary the profile of the impact force. If the impact tool has multiple impact heads which are arranged one behind the other, it is possible, through the selection of a suitable impact angle, for the impact forces of the various impact bodies to be introduced at a suitable location and at a suitable angle. The impact position and the impact angle preferably correspond to a profile of a loading maximum of the transition radius.

If the impact tool has multiple impact heads which are arranged adjacent to one another, provision may for example be made whereby a central impact head is, with regard to its impact position and the impact angle, aligned with the loading maximum, or whereby the loading maximum is situated between two central impact heads.

The variation of the impact angle, that is to say the profile of the impact tool on which the impact heads are arranged, makes it possible to adjust precisely to the demand of the corresponding crankshaft, in particular to machine the loading maximum of the transition radius in targeted fashion.

A particular advantage may be obtained if multiple impact tools are assigned to the same transition radius. Through the variation of the impact angle of the impact tools, it is thus possible not only for the position at which the impact heads of the individual impact tools strike the transition radius, but also the impact angle thereof, to be varied. It is thus for example also possible for the impact positions of the impact heads of the individual impact tools to be identical, but for the angle to differ.

The particular embodiment of varying the spacing between a deflection point of the deflecting unit and the front end of the one impact head or the multiple impact heads of the at least one impact tool thus makes it possible for the impact force to be introduced at a preferred point and at a preferred angle.

By contrast, with the methods and apparatuses of the known prior art, it is only possible to introduce the impact force at a predefined fixed angle into the transition radii. An impact angle of approximately 45° is normally provided for this purpose.

Depending on the use of the crankshaft, it may be advantageous to select a different angle rather than a fixed impact angle of 45°, for example.

The most highly loaded location of the crankshaft is generally determined from the operation of the engine, and/or is determined by means of mathematical models. For new consideration approaches, the maximum loads from uniaxial loading and from biaxial superposed loading are considered for this purpose.

Through the adjustment of the impact angle, highly precise working and impact hardening can be ensured. By virtue of the fact that the impact forces can be introduced in targeted fashion into a loading maximum of the transition radius, and said impact forces run at an optimum angle, the impact force can possibly be reduced, whilst the attainable fatigue strength effect remains unchanged. The apparatus is thus particularly efficient.

Provision may be made whereby two or more impact tools are assigned to a common transition radius, wherein the impact tools each have at least one (preferably exactly one) impact head, and an impact angle of the impact tools is not identical.

In one embodiment of the invention, provision may be made whereby the length of the at least one impact tool is adjustable, preferably in telescopic fashion.

For this purpose, the impact tool may be designed in the manner of a telescopic rail or have a telescopic extension means. The at least one impact tool may also be designed as a telescopic tube. The invention is self-evidently not to be understood as being restricted to a particular type of telescopic extension means or to a particular type of telescopic capability.

The length of the at least one impact tool may for example also be adjusted by means of a thread.

Provision may be made whereby the length of the at least one impact tool is adjustable manually and/or by actuator means. For example, an electric motor, in particular a linear drive, may be provided for this purpose. The electric motor may however basically be any electric motor, for example a three-phase motor, an AC motor, a DC motor or a universal motor. A stepper motor may preferably be used.

In one embodiment of the invention, a changeover device with a magazine may be provided in order to exchange the at least one impact tool and/or the at least one impact head and/or the deflecting unit and/or the impact device in order to adjust the spacing between the deflection point of the deflecting unit and the front end of an impact head of the at least one impact tool to a different value.

It is known that, owing to the high impact forces, high mechanical loads act on the components of the impact device. In particular in the case of filigree components being used for adjusting the length of the at least one impact tool, the service life of the impact device or of the components thereof can be restricted in this way. If a magazine or a changeover device is provided for the at least one impact tool and/or the impact heads and/or the deflecting unit and/or the impact device, the impact device or the apparatus as a whole can be of particularly robust design, because a telescopic movement of the at least one impact tool can possibly be omitted.

The spacing between the deflection point of the deflecting unit and the impact heads of the at least one impact tool can thus be advantageously adjustable by means of the changeover device with the magazine, by virtue of components of the impact device being exchanged for the purposes of the length adjustment.

Provision may also be made whereby the spacing between the deflection point of the deflecting unit and the front end of an impact head of the at least one impact tool is adjustable through the use of distancing rings or spacers with different dimensions.

In one embodiment of the invention, two or more impact devices may be provided, wherein the spacing between the deflection point of the deflection device and the front end of the impact head or of the impact heads of a first impact device is not identical to the spacing between the deflection point of the deflection device and the front end of the impact head or of the impact heads of a second impact device.

It is thus possible to provide multiple impact tools which can be used independently of one another, in particular through the use of multiple impact devices with in each case one or more impact tools, which are capable of introducing respective impact forces into any transition radii of the crankshaft, wherein a corresponding synchronization with one another or between controllers of the impact tools may be provided. The impact hardening of the crankshaft can thus also be performed particularly quickly, because multiple impact devices can be used simultaneously.

In the case of multiple impact devices being used, provision may be made whereby the respective spacings between the deflection points and the impact heads are identical in all impact tools or differ from one another in at least two impact tools. It is preferable if the respective spacings between the deflection point of the deflecting unit and the impact heads of two impact tools for the hardening of transition radii that adjoin the same journal are identical.

In one embodiment of the invention, provision may be made whereby the impact angle between the longitudinal axis of the at least one impact tool and a line perpendicular to the longitudinal axis of the crankshaft amounts to 5° to 80°, preferably 10° to 70°, more preferably 20° to 60° and particularly preferably 30° to 55°, in particular 35° to 50°.

The invention also relates to a method for the impact hardening of transition radii of a crankshaft, in particular of transition radii between connecting-rod bearing journals and crank webs and/or transition radii between main bearing journals and the crank webs of the crankshaft.

The invention also relates to transitions to flanges, journals and other geometrical changes in cross section—both for tangential and undercut radii.

The method according to the invention provides for the impact hardening of transition radii to be performed by means of an impact device which has multiple impact heads which are assigned to the same transition radius.

Features that have already been described in conjunction with the apparatus according to the invention may self-evidently also be advantageously implemented for the method according to the invention—and vice versa. Furthermore, advantages that have already been mentioned in conjunction with the apparatus according to the invention may also be understood as relating to the method according to the invention—and vice versa.

In one embodiment of the method, provision may be made whereby the impact angle is selected in accordance with the profile of a loading maximum of the transition radius, wherein the profile of the loading maximum is determined on the basis of simulations and/or calculations and/or series of tests of the respective crankshaft type.

The most highly loaded locations of the crankshaft are also preferably identified in advance. The impact force can then preferably be introduced in targeted fashion into the corresponding loading maxima.

The crankshaft can be impact-hardened with particularly high precision through the preferably provided adjustment of the spacing between the deflection point of the deflecting unit and the front end of the one impact head or the impact heads of the at least one impact tool.

Through the adjustment of the spacing, not only the impact point but also the impact direction can be defined. In this way, crankshafts can be produced whose fatigue strength, in particular bending and torsional fatigue strength, is further optimized. Alternatively, by means of the precision which is now available, an existing fatigue strength can be attained simply through the use of lower impact forces.

In one embodiment of the invention, provision may be made whereby all transition radii between the connecting-rod bearing journals and the crank webs and/or all transition radii between the main bearing journals and the crank webs are impact-hardened at the same impact angle.

It is also possible for all transitions to flanges, journals and/or other geometrical changes in cross section—both for tangential and undercut radii—to be impact-hardened at the same impact angle.

Provision may therefore be made whereby all transition radii of the crankshaft are impact-hardened at the same impact angle, wherein the impact angle selected for this purpose is optimized with regard to the most highly loaded point of the crankshaft. Provision may however also be made whereby all transition radii of the connecting-rod bearing journals are impact-hardened at a first impact angle and all transition radii of the main bearing journals are impact-hardened at a second impact angle, wherein the first and the second impact angle are optimized correspondingly to the respectively most highly loaded locations and/or the profile of the loading maximum.

In an alternative embodiment of the invention, provision may be made whereby at least two transition radii between the connecting-rod bearing journals and the crank webs are impact-hardened at a different impact angle and/or whereby at least two transition radii between the main bearing journals and the crank webs are impact-hardened at a different impact angle and/or whereby at least one transition radius between the connecting-rod bearing journal and the crank webs is impact-hardened at a different impact angle than a transition radius between the main bearing journals and the crank webs.

The impact angles can thus be defined or optimized individually for each transition radius or for groups of transition radii.

For example, different impact angles can be used simultaneously at one journal location.

In one embodiment of the invention, provision may finally also be made whereby the impact angle is varied during the impact hardening of a transition radius running in annularly encircling fashion around the connecting-rod bearing journal and/or the main bearing journal.

This self-evidently also applies for transitions to flanges, journals and/or other geometrical changes in cross section—both for tangential and undercut radii.

It has been found that a further increase in the fatigue strength or bending fatigue strength and/or torsional fatigue strength can be achieved in this way.

For example, a different impact angle may be provided in the so-called bottom dead center of a connecting-rod bearing journal, or in a defined region around the bottom dead center, than in the remaining region of the transition radius.

The impact pressures that can be implemented by the impact piston to generate the impact force may—depending on the operating mode—amount to between 10 and 300 bar, preferably between 30 and 180 bar, and particularly preferably between 50 and 130 bar.

The temperature in the region of the crankshaft segment or transition radius to be machined should preferably be no higher than 65° C.; values between 12° C. and 25° C. are preferred.

It has been found from experience that micro-cracks, which are not capable of propagating, can form in the surface of crankshafts after dynamic loading in the engine or on the test stand. These micro-cracks have no effect on the fatigue strength characteristics but they can impair the visual appearance.

Since the introduction of internal compressive stresses can be performed preferably to a depth of 15 mm or else even deeper, this means that a removal of a few millimeters, for example of 0.1 to 3 mm, preferably 0.5 mm, can be performed in the surface region of the crankshaft without the flexural and torsional fatigue strength, or the fatigue strength, of the crankshaft being adversely affected.

Tests have shown that such measures can even slightly increase the fatigue strength, for example by up to 5%.

The removal of the surface may be performed in various ways, for example by grinding, turning, milling, rotary milling, peeling or polishing.

In particular if provision is made whereby the impact angle is varied by actuator means during the impact hardening of a transition radius, an open-loop and/or closed-loop control device, preferably comprising a microprocessor, may be provided in order to activate the corresponding actuator arrangement.

Instead of a microprocessor, provision may also be made of any other device for implementing an open-loop and/or closed-loop control device, for example one or more arrangements of discrete electrical components on a circuit board, a Programmable Logic Controller (PLC), an Application-Specific Integrated Circuit (ASIC) or some other programmable circuit, for example also a Field Programmable Gate Array (FPGA), a Programmable Logic Arrangement (PLA) and/or a commercially available computer.

Some of the components of the apparatus according to the invention may basically correspond in terms of their construction to the apparatus according to EP 1 716 260 B1, for which reason the content of disclosure of EP 1 716 260 B1 is, in its entirety, integrated into the present disclosure by reference.

The invention also relates to a crankshaft produced in accordance with a method described above.

The crankshaft according to the invention differs from conventional crankshafts in particular in that, for the hardening thereof, at least two impact heads are assigned to the same transition radius and, in addition possibly different impact angles are used, giving rise to characteristic hardening of the transition radii.

BRIEF DESCRIPTION OF THE FIGURES

Exemplary embodiments of the invention will be described in more detail below on the basis of the drawing.

The figures each show preferred exemplary embodiments, in which individual features of the present invention are illustrated in combination with one another. Features of an exemplary embodiment are also implementable separately from the other features of the same exemplary embodiment, and may accordingly be readily combined by a person skilled in the art with features of other exemplary embodiments in order to form further meaningful combinations and sub-combinations.

In the figures, functionally identical elements are denoted by the same reference designations.

In the figures, in each case schematically:

FIG. 1 shows an overall view of an apparatus according to the invention for carrying out the method in a first embodiment;

FIG. 2 shows a perspective view of a part of the apparatus according to the invention for carrying out the method in a second embodiment;

FIG. 3 shows an impact device with two impact tools in an enlarged illustration as per the detail "A" from FIG. 1;

FIG. 4 shows an impact device with only one impact tool;

FIG. 5a is an enlarged illustration of a transition radius and of an impact tool with three impact heads;

FIG. 5b is an enlarged illustration of a transition radius and three flattened impact tools with in each case one impact head;

FIG. 6 shows an example of an offset of impact heads;

FIG. 7 shows a transition radius impact-hardened by means of three impact heads, with three overlapping tracks of impact impressions;

FIG. 8 shows a transition radius impact-hardened by means of two impact heads, with tracks of impact impressions situated one inside the other;

FIG. 9 shows an impact device with two telescopic impact tools;

Figure 10:
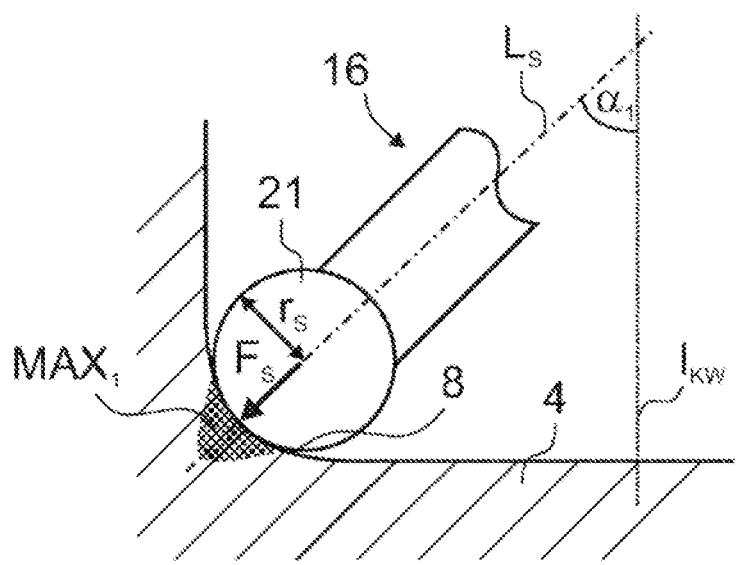
Figure 11:
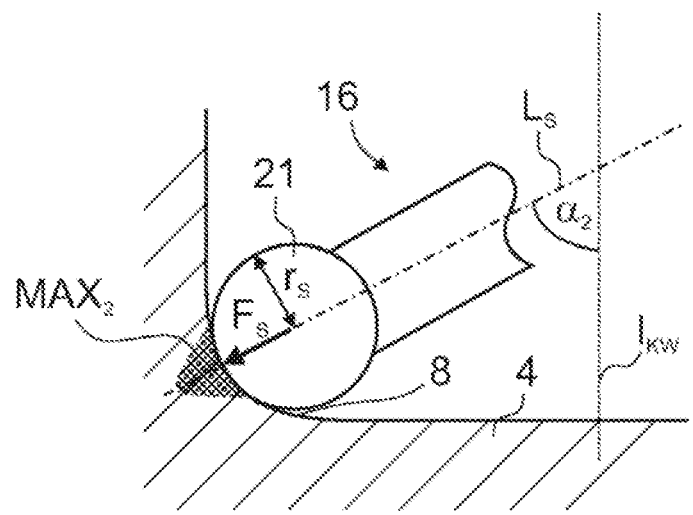
Figure 12:
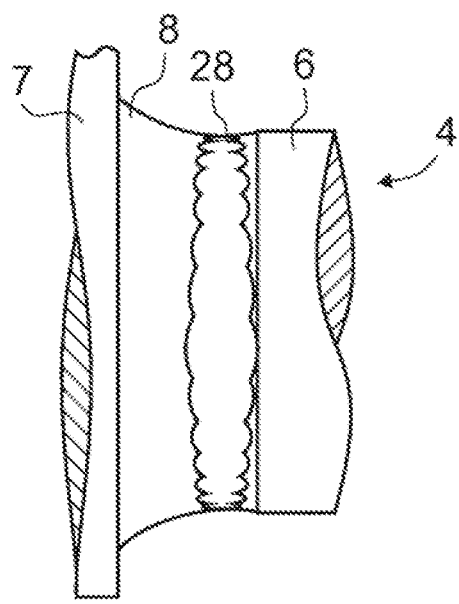
Figure 13:
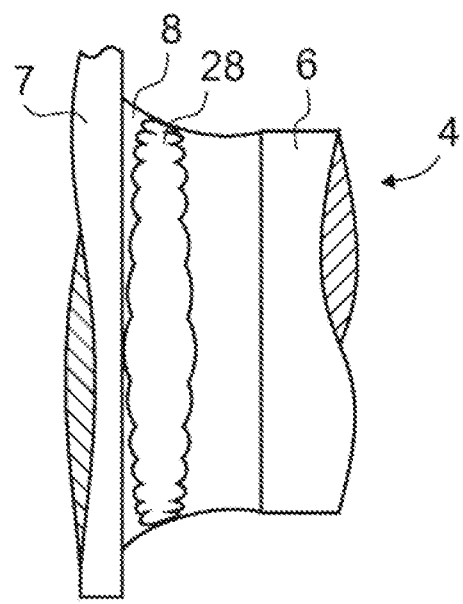
Figure 14:
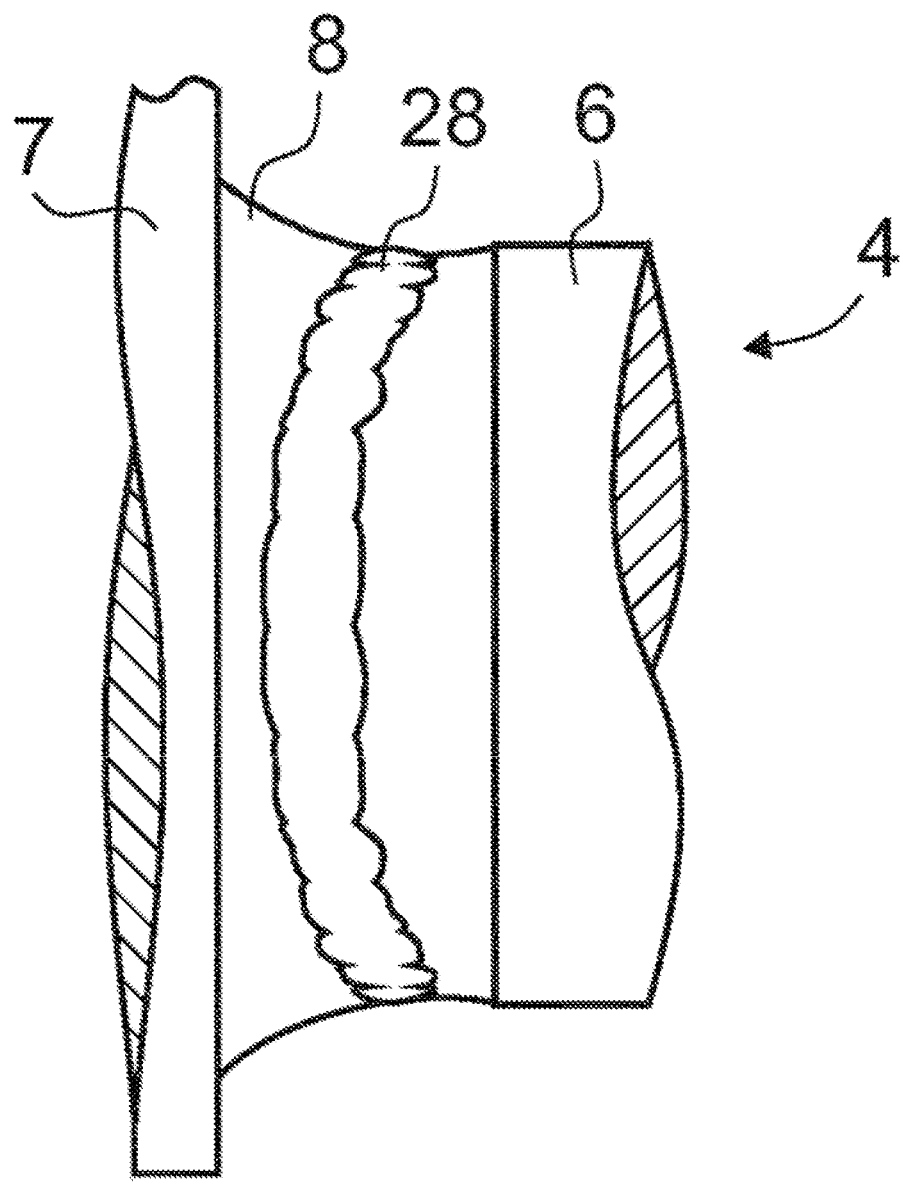

FIG. 10 is an enlarged illustration of a transition radius and of an impact tool with an impact head, wherein the impact tool is aligned at a first impact angle;

FIG. 11 is an enlarged illustration of a transition radius and of an impact tool with an impact head, wherein the impact tool is aligned at a second impact angle;

FIG. 12 shows an impact-hardened transition radius in the case of which a first impact angle has been used for the impact hardening;

FIG. 13 shows an impact-hardened transition radius in the case of which a second impact angle has been used for the impact hardening; and FIG. 14 shows an impact-hardened transition radius in the case of which the impact angle has been varied during the impact hardening along the transition radius running in annularly encircling fashion around the journal.

DETAILED DESCRIPTION OF THE INVENTION

The apparatus illustrated in an overall view in FIG. 1 basically corresponds in terms of its construction to the apparatuses as per DE 34 38 742 C2 and EP 1 716 260 B1 with one or more impact devices 1, for which reason only the important parts, and the differences in relation to the prior art, will be discussed in more detail below.

The apparatus has a machine bed 2 and a drive device 3. The drive device 3 is used to move or rotate a crankshaft 4 along a direction of rotation into an impact position.

The crankshaft 4 has connecting-rod bearing journals 5 and main bearing journals 6, between which crank webs 7 are arranged in each case. Transition radii 8 (see FIGS. 3 to 8 and 10 to 14) are formed between connecting-rod bearing journals 5 and crank webs 7 and between main bearing journals 6 and crank webs 7, or generally between transitions in cross section of the crankshaft 4.

At that side of the crankshaft 4 which faces toward the drive device 3, there is provided a fastening device 9 which has a clamping disk or a fastening flange 10. On that side of the crankshaft 4 which is averted from the drive device 3, a support 11 preferably in the manner of a tail-stock is provided, which has a further fastening device 9 for the purposes of rotatably receiving or rotatably fixing the crankshaft 4. Optionally or in addition to the support 11, a back rest may be provided which is positioned at a rotationally symmetrical location.

The drive device 3 is capable of setting the crankshaft 4 in rotation motion along an axis of rotation C. Provision may be made here whereby the main axis of rotation $C_{KW}$ of the crankshaft 4 is positioned eccentrically from the axis of rotation C of the drive device 3, as illustrated in FIG. 1 and FIG. 2. For this purpose, it is preferably possible for alignment means 17 (see FIG. 2) to be provided in the region of the fastening device 9. Here, provision may be made whereby the alignment means 17 displace a central axis of the journal 5, 6 that is respectively to be hardened such that the central axis of the journal 5, 6 lies on the axis of rotation C.

A direct drive, preferably without a clutch, may be provided for the drive device 3. A motor, preferably an electric motor, of the drive device 3 can thus be coupled without a transmission ratio or transmission to the fastening device 9 or to the crankshaft 4. An input shaft 13 or a drive shaft may be provided for transmitting the drive power.

The impact devices 1 described in more detail by way of example below are each held adjustably in a displacement and adjustment device 15 in order to adapt them to the position of the connecting-rod bearing journals 5 and of the main bearing journals 6 and to the length of the crankshaft 4.

Figure 1:
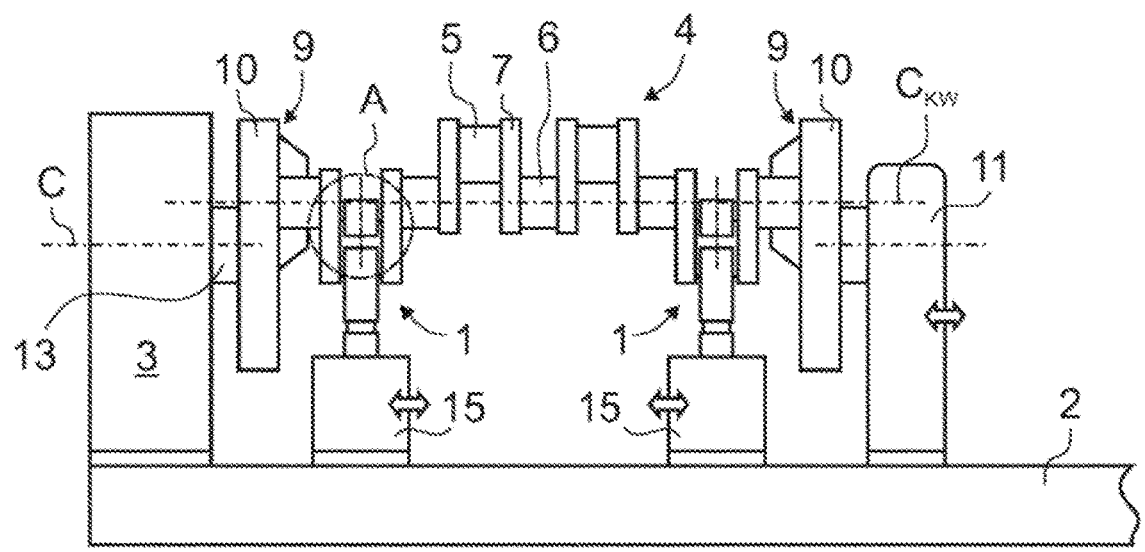
Figure 2:
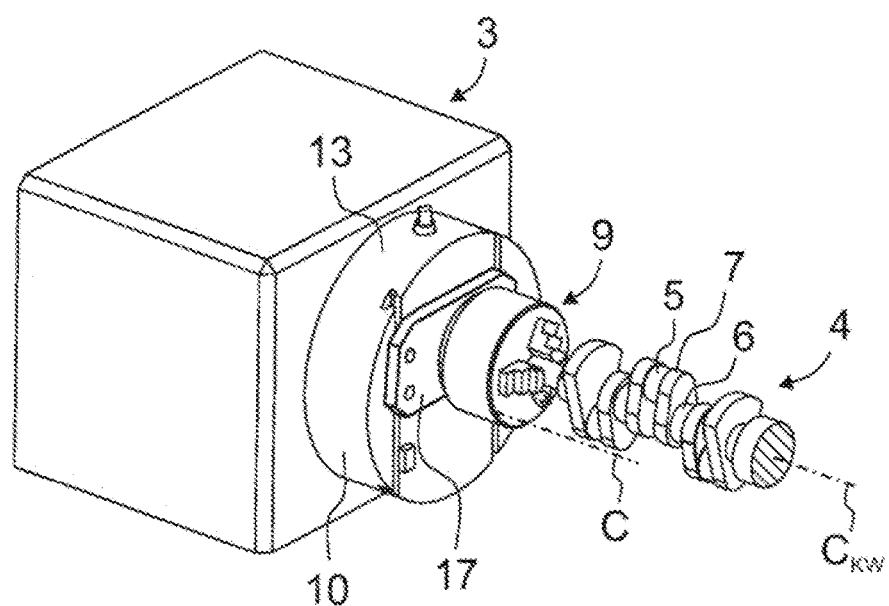

The support 11 may also be designed to be displaceable, as indicated by the double arrows in FIG. 1.

Two impact devices 1 are illustrated in FIG. 1, though basically any number of impact devices 1 may be provided, for example also only a single impact device 1.

For the operation of the drive device 3, which preferably comprises an electric motor, closed-loop position control may be used in order to rotate the crankshaft 4 into the respective impact position, wherein the crankshaft 4 is rotated preferably in stepped or clocked fashion.

After a transition radius 8 has been impact-hardened in the desired manner, the impact device(s) 1 can be moved to the next transition radii 8 that are to be hardened.

FIG. 2 illustrates, in a perspective view, a detail of a further apparatus for carrying out the method according to the invention but without an impact device. Here, the apparatus of FIG. 2 is substantially identical to the apparatus of FIG. 1, for which reason only the important differences will be referred to in detail below.

A drive device 3 is once again provided. Furthermore, a fastening device 9 is provided which has a fastening flange 10 and, fastened thereto, a face plate with clamping jaws for fixing the crankshaft 4. The face plate with the clamping jaws of the fastening device 9 is arranged on the fastening flange 10 adjustably on an alignment means 17, whereby the longitudinal axis $C_{KW}$ of the crankshaft 4 can be displaced relative to the axis of rotation C of a drive shaft or of an input shaft 13.

The crankshaft 4 of FIG. 2 has a configuration which deviates from the embodiment illustrated in FIG. 1, but basically likewise comprises connecting-rod bearing journals 5, main bearing journals 6 and crank webs 7.

In FIG. 2 (as in FIG. 1), a further fastening device 9 may be provided at that end of the crankshaft 4 which is averted from the drive device 3, though said further fastening device may also be omitted.

Figure 3:
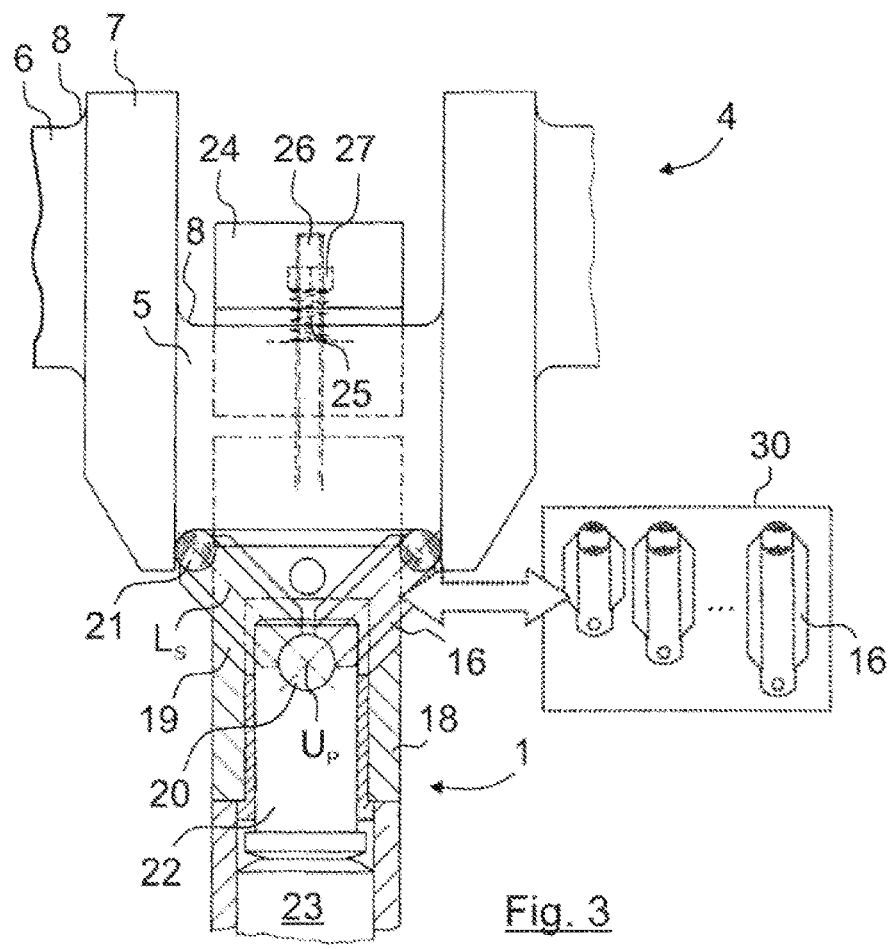

An impact device 1 of FIG. 1 is illustrated in more detail by way of example in FIG. 3. The invention may basically be implemented with any impact device 1. The impact device 1 described below is however particularly suitable. It has a main body 18 which may be provided with a prismatic abutment correspondingly to the radius of the crankshaft segment to be machined, and which preferably has guides 19 which guide two impact tools 16 in their support plane and provide them with a corresponding degree of freedom in terms of the support angle or impact angle α (see FIGS. 9 to 11) about a deflecting unit 20, which is advantageous for the adaptation to the dimensional conditions of the crankshaft 4. In each case one ball as impact head 21 is arranged at the front ends of the two impact tools 16. An intermediate part 22 produces the connection between an impact piston 23 and the deflecting unit 20, which transmits the impact energy to the impact tools 16. The intermediate part 22 may possibly also be omitted.

According to the invention, provision is made whereby the impact device 1 has multiple impact heads 21 which are assigned to the same transition radius 8.

For this purpose, provision may be made whereby the impact device 1 has at least one impact tool 16 with multiple impact heads 21. In the sectional illustration of FIG. 3, in each case only one impact head 21 is illustrated in the drawing for the respective transition radius 8 owing to the illustration. Nevertheless, in the variant of FIG. 3, it is possible for multiple impact heads 21, which are for example offset one behind the other, to be arranged for one or for both transition radii 8. In particular, in the case of the impact device 1 of FIG. 3 with the two impact tools 16, it is thus also possible for only one of the two impact tools 16 to have multiple impact heads 21 which are assigned to the same transition radius 8.

In the context of the invention, provision may also be made whereby the impact device 1 has multiple impact tools 16, wherein at least two impact tools 16 each have one or more impact heads 21 which are assigned to the same transition radius 8. Here, the impact tools 16 assigned to one transition radius 8 may each have one or more impact heads 21.

The impact device 1 of FIG. 3 may also be an impact device in the case of which in each case only one impact head 21 is provided for the impact tools 16 if, for example, a second impact device 1 is provided (see for example in FIG. 1) which has multiple impact heads 21 which are assigned to the same transition radius 8.

It is also possible for multiple impact devices 1 to be provided, wherein at least two impact heads 21 of the impact devices 1 are assigned to the same transition radius 8.

To increase the effectiveness of the impact, a clamping prism 24 may be fastened, via springs 25, by means of adjustable clamping bolts 26 with clamping nuts 27 to that side of the journal 5, 6 which is averted from the main body 18. Other structural solutions are also possible here.

By means of the arrangement of multiple impact devices 1 over the length of the crankshaft 4 to be machined, it is possible, as required, for all centrally and possibly eccentrically running regions of the crankshaft 4 to be machined simultaneously. As already mentioned, in this case, it is not necessary for all of the impact devices 1 to have multiple impact heads 21 assigned in accordance with the invention.

The impact piston 23 transmits an impulse to the impact tools 16 via the deflecting unit 20, whereby the impact heads 21 of the impact tools 16 introduce the impact force $F_S$ into the transition radii 8.

The expression "$F_S$" and similar expressions in the present description are to be understood merely as placeholders/variables for any impact force that appears appropriate to a person skilled in the art. Here, where the description refers to "the impact force $F_S$", this may thus refer in each case to different or else identical impact forces.

Figure 4:
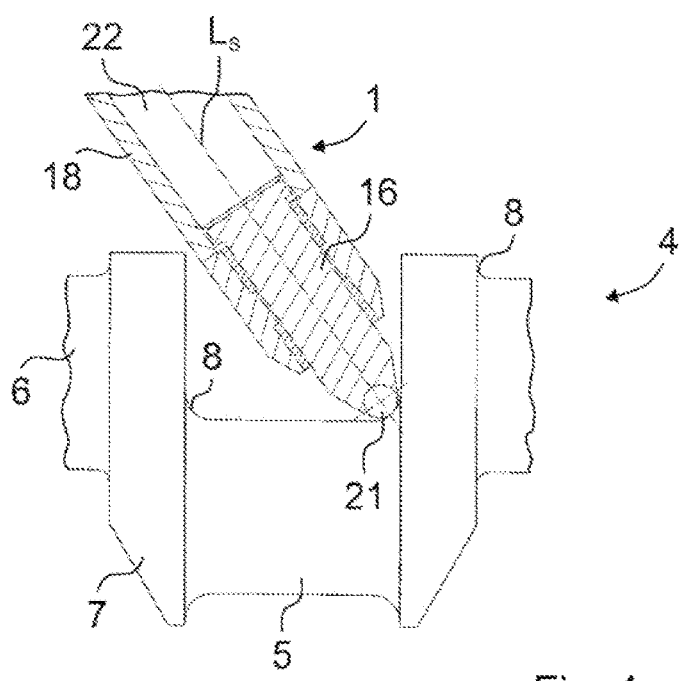

FIG. 4 shows an impact device 1 which is equipped with only one impact tool 16. In the exemplary embodiment shown, the impact device 1 is preferably inclined relative to the crankshaft 4, specifically such that the impact tool 16, the longitudinal axis $L_S$ of which is arranged coaxially with respect to the longitudinal axis of the impact device 1, impacts perpendicularly against the region of the crankshaft segment to be machined, in the present case of the transition radius 8 to be machined. In this case, although it is possible for in each case only one crankshaft segment to be machined, the structural design and the transmission of force by the impact device 1 are on the other hand better and simpler. Bore ends can additionally be hardened by means of this impact tool 16 in a standing position.

This embodiment has proven particularly advantageous for use on non-symmetrical crankshaft segments, such as the end regions and the oil bore ends of the crankshaft 4.

As in FIG. 3 already, it is also the case that only one impact head 21 is illustrated in the drawing in the case of the impact device 1 of FIG. 4. The impact device 1 of FIG. 4 may however have any number of impact heads, for example two impact heads, three impact heads or four impact heads. Furthermore, multiple impact devices 1 and/or impact heads 16 of the type illustrated in FIG. 4 may be provided which have in each case one or more impact heads 21 and which are assigned to the same transition radius 8.

Figure 5A:
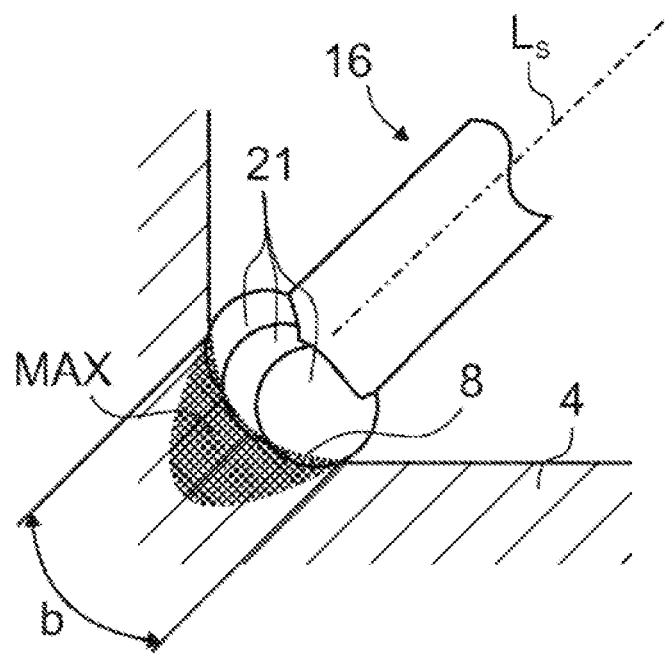

FIG. 5a illustrates, in highly schematic form, an impact tool 16 with three impact heads 21, wherein the impact heads 21 are assigned to the same transition radius 8. An even further enlarged and even more highly schematic illustration of the geometrical relationships in this regard is shown (in greatly exaggerated form) in FIG. 6.

Figure 6:
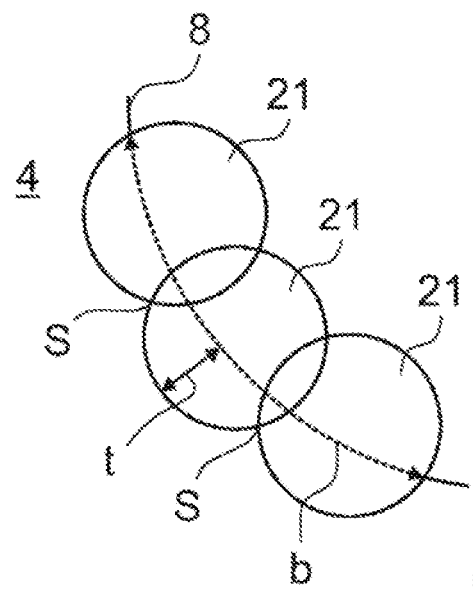

Here, FIGS. 5a and 6 show an arrangement of three impact heads 21 which, during the impact hardening of the transition radius 8 running in annularly encircling fashion around the exemplary crankshaft segment, are arranged offset one behind the other and adjacent to one another. In this way, internal compressive stresses can be introduced along the circumference of the transition radius 8 over a wide range or a large "width" b and with a simultaneously high depth effect (indicated in FIG. 5a by the hatched region MAX).

Figure 7:
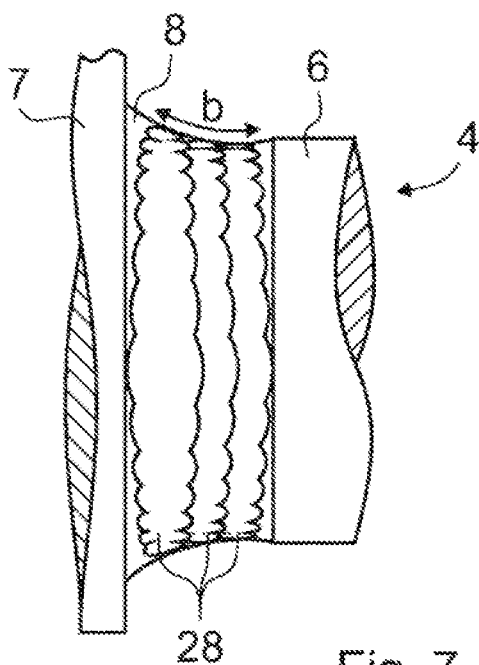

Here, the impact heads 21 are arranged such that, during the impact hardening of the transition radius 8 running in annularly encircling fashion around the illustrated crankshaft segment, the impact heads 21 each generate their own tracks of impact impressions 28 (see FIG. 7).

The impact heads 21 may be arranged offset one behind the other and/or offset adjacent to one another such that the tracks of the impact impressions 28 overlap.

As already indicated above, the impact heads 21 for the impact hardening may have a spherical surface or may be of substantially spherical form.

If provision is made whereby the tracks of impact impressions 28 of the impact heads 21 overlap, an arrangement illustrated in exaggerated form in FIG. 6 is advantageous. Here, the impact heads 21 are arranged offset with respect to one another such that an overlap of the geometry of the impact heads 21 in a circumferential direction of the transition radius 8 is, as viewed in cross section, situated within the crankshaft 4. In the example of FIG. 6 with the impact heads 21 with the spherical surface, the intersection points S of the respective circle circumferences is arranged within the transition radius 8, that is to say within the crankshaft 4. Here, the penetration depth t (illustrated in exaggerated form) of the impact heads 21 during the impact hardening must be taken into consideration.

Figure 5B:
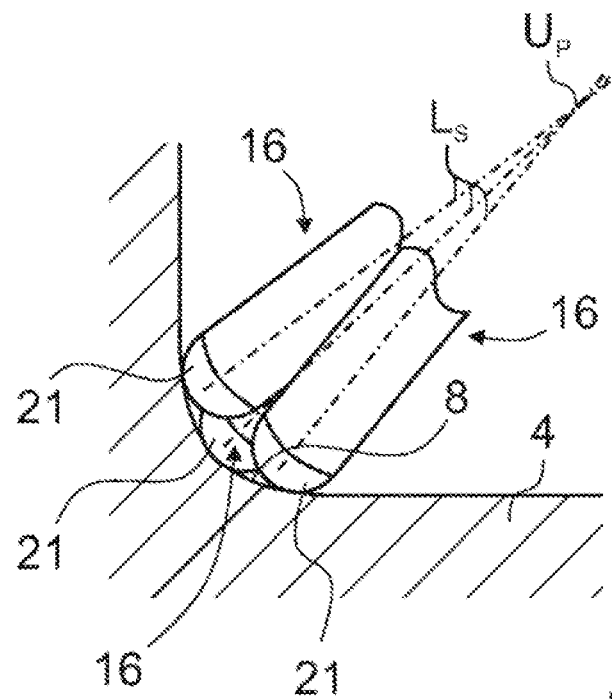

As already mentioned above, provision may also be made of multiple impact tools 16 with in each case one or more impact heads 21 which are assigned to the same transition radius 8. To further illustrate this, an exemplary variant of the invention is illustrated in FIG. 5b. In the variant of FIG. 5b, three impact tools 16 are provided which have in each case one impact head 21. Thus, similarly to the embodiment shown in FIG. 5a, it is once again the case that three impact heads 21 are provided which are assigned to the same transition radius 8.

The impact tools 16 introduce the impact force $F_S$ along their respective longitudinal axis $L_S$ into the transition radius 8. Here, the impact tools 16 are arranged on the deflecting unit 20 (in order to simplify the illustration, only the deflection point $U_P$ of the deflecting unit is illustrated in FIG. 5b). The impact tools 16 may be designed, and oriented relative to one another, such that the impact tools support one another during the introduction of the impact force $F_S$, such that said impact tools do not slip out of their associated respective impact position along the circumference of the transition radius 8. Alternatively and/or in addition, the position of the deflecting point $U_P$ may deviate from the position shown and be arranged for example closer to the transition radius 8, resulting in a changed impact angle α for the outer impact tools 16, which can likewise prevent slippage.

The illustration of FIG. 5b is in any case to be understood as being merely schematic, in particular with regard to the proportions and angle orientations.

The impact tools 16 are arranged one above the other and/or so as to overlap, and, for this purpose, may be of particularly flat form in order to allow for the relatively constricted geometrical requirements. In the variant shown in FIG. 5b, an impact tool 16 arranged centrally along the circumference of the transition radius 8 is offset behind the two other impact tools 16, whereby an even more constricted arrangement of the impact tools 16 and thus of the impact heads 21 can be achieved. It is however basically possible for any offset of the impact tools 16 with respect to one another to be provided.

FIG. 7 illustrates an exemplary transition radius 8 between a main bearing journal 6 and a crank web 7, in the case of which the impact impressions 28 that have been generated by respective impact heads 21 overlap along the transition radius 8 running in annularly encircling fashion around the main bearing journal 6. Here, during a subsequent impact, the respective impact head 21 penetrates at least partially into the impact impression 28 of the preceding impact, giving rise to the "track" of impact impressions 28 illustrated in FIG. 7 and in the following figures. The characteristic hardening pattern or the overlapping tracks of the impact impressions 28 may be achieved for example by means of an arrangement with impact heads 21 offset one behind the other and adjacent to one another, as illustrated in FIG. 5a or 5b. The internal compressive stresses are thus introduced into the crankshaft 4 over a large width b along the circumference of the transition radius 8.

Figure 8:
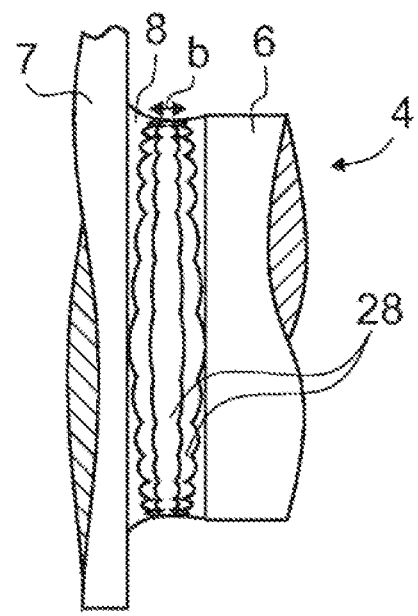

FIG. 8 illustrates a further exemplary transition radius 8 which exhibits two tracks, situated one inside the other, of impact impressions 28. Such a pattern may be achieved for example by virtue of two impact heads 21 being arranged one behind the other such that, during the impact hardening of a transition radius 8 running in annularly encircling fashion around the main bearing journal 6, the impact heads 21 each generate impact impressions 28. Here, the impact head 21 that generates the inner track of impact impressions 28 is smaller than the impact head 21 that generates the outer track of impact impressions 28.

Provision may thus be made for the impact heads 21 to have different sizes. The impact heads 21 may also be of the same size. Provision may also be made for the second impact head 21, that is to say the impact head 21 that impacts in the impact impression 28 that has already been generated by the first impact head 21, to be larger.

By means of impact hardening in the manner of FIG. 8, it is for example possible for internal compressive stresses to be introduced into the crankshaft 4 to a hitherto unattained depth.

In one particular variant of the invention, provision may be made whereby the spacing d (cf. FIG. 9) between a deflection point $U_P$ of the deflecting unit 20 and the front end of the respective impact head 21 or of the respective impact heads 21 of the impact tools 16 being adjustable.

One possible technical solution for the adjustment of the spacing d is illustrated in schematic form by dashed lines in FIG. 3, in which a changeover device 30 with a magazine is provided in order to exchange the at least one impact tool 16 and/or the at least one impact head 21 and/or the deflecting unit 20 and/or the at least one impact device 1 in order to adjust the spacing d between the deflection point $U_P$ of the deflecting unit 20 and the front end of one or multiple impact heads 21 of the at least one impact tool 16 to a different value. In particular, a changeover device 30 for the exchange of impact tools 16 is indicated in FIG. 3. For this purpose, the changeover device 30 comprises a selection of impact tools 16 of in each case different length. By exchanging an impact tool 16, the spacing d and thus the impact angle α can therefore be adjusted.

Figure 9:
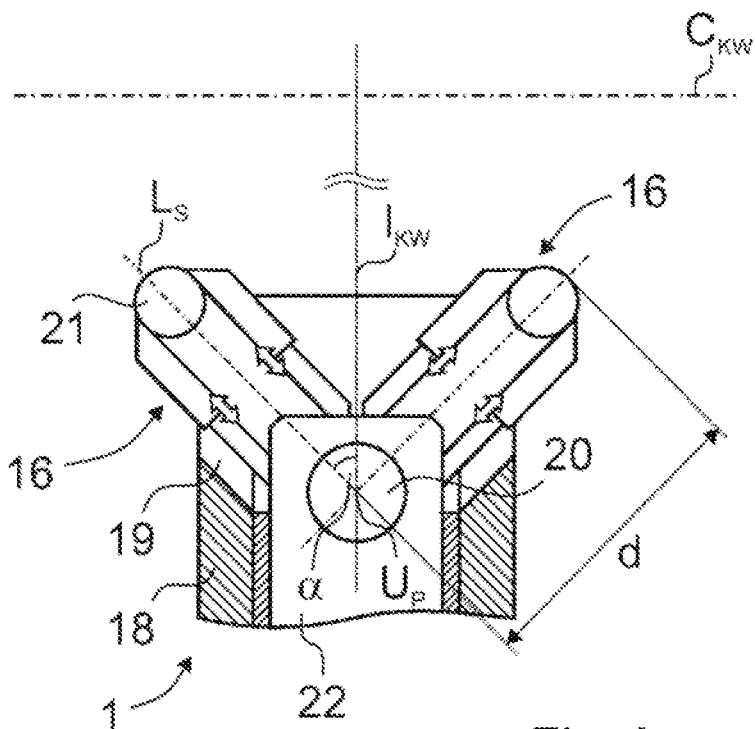

Provision may also be made whereby the length of the impact tools 16 is adjustable, preferably telescopically. A corresponding construction is illustrated in FIG. 9. Here, FIG. 9 shows a detail of an impact device 1, which may be of substantially identical design to the embodiment of FIG. 3.

In FIG. 9, two telescopic impact tools 16 are schematically illustrated. By means of the adjustable length of the impact tools 16, the spacing d between the deflection point $U_P$ of the deflecting unit 20 and the front end of an impact head 21 is adjustable. In this way, it is thus indirectly also possible for the impact angle α and possibly also the impact position to be influenced.

Provision may also be made, as illustrated in FIG. 1, for multiple impact devices 1 to be used. The respective spacing d between the deflection point $U_P$ and the impact heads 21 is then preferably not identical at least in the case of two impact devices 1. This makes it possible for the impact devices 1 to be used in each case for the impact hardening of a transition radius 8 or of a group of transition radii 8, wherein the impact tools 16 of the impact device 1 are in each case already adjusted to the preferentially provided impact angle α. Conversion of the impact device 1 is thus not necessary. If the crankshaft 4 has only transition radii 8 with two different advantageous impact angles α, it is thus preferably the case that two correspondingly preset impact devices 1 are sufficient.

Provision may for example be made whereby a first impact device 1 introduces impact forces $F_S$ at a first impact angle $α_1$ and a second impact device 1 introduces impact forces $F_S$ at a second impact angle $α_2$. Use may also be made of impact devices 1 in the case of which the spacing d and/or the impact angle α is adjustable in a different way. It is also possible for a conventional impact device to be combined with an impact device 1 with adjustable spacing. Any combinations, also with an impact device 1 with multiple impact heads 21 which are assigned to the same transition radius 8, are conceivable within the scope of the invention.

Provision may be made whereby the impact angle α between the longitudinal axis $L_S$ of the at least one impact tool 16 and a line $l_{KW}$ perpendicular to the longitudinal axis $C_{KW}$ of the crankshaft 4 amounts to 5° to 80°, preferably 10° to 70°, more preferably 20° to 60° and particularly preferably 30° to 55°, in particular 35° to 50°.

To illustrate the relationships, FIGS. 10 and 11 illustrate enlarged views which highly schematically illustrate an impact head 21 of an impact tool 16 and an exemplary transition radius 8 of a crankshaft 4. All relationships self-evidently also apply if multiple impact heads 21 are provided. Here, in the example of FIG. 10, impact hardening is performed at a first impact angle $α_1$, and in FIG. 11, impact hardening is performed at a second impact angle $α_2$.

Through the corresponding adjustment of the impact angle α by means of the variation of the spacing d between the deflection point $U_P$ of the deflecting unit 20 and the at least one impact head 21 of the impact tool 16, the direction of the impact force $F_S$ can be predefined, whereby the range of greatest effectiveness of the impact hardening can be set in targeted fashion.

Provision may also be made for the impact force $F_S$ to be reduced in targeted fashion or for the direction of action to be varied, for example if reduced cross sections, bores or other geometrical conditions necessitate this.

Preferably, the impact angle α is selected in accordance with the profile of a loading maximum $MAX_1$, $MAX_2$ of the transition radius 8, wherein the profile of the loading maximum $MAX_1$, $MAX_2$ is determined on the basis of simulations and/or calculations and/or series of tests of the respective crankshaft type.

In FIG. 11, the impact head 21 is positioned at the same position of the transition radius 8 as in FIG. 10. However, the spacing d between the deflection point $U_P$ of the deflecting unit 20 and the impact head 21 is set such that the impact tool 16 is aligned at a different impact angle α than in FIG. 10. It follows from this that the impact is introduced into the transition radius 8 at the angle $α_2$, even though the impact head 21 is basically applied at the same position as in FIG. 10.

The illustration in FIG. 11 differs to a particularly great extent from the illustration in FIG. 10 for illustrative purposes.

It is basically also possible for the positioning of the impact head 21 in the transition radius 8 to be varied, that is to say the impact head 21 could possibly also be applied at a different position along the circumference of the transition radius 8, wherein, at the same time, the impact angle α may be variable.

As already mentioned, the impact head 21 or the impact heads 21 can have different sizes. In particular, if only one impact head 21 is provided on an impact tool 16, the impact head 21 may have a radius $r_S$ of which the magnitude amounts to 75% to 99% of the transition radius 8, preferably 85% to 98% of the transition radius 8 and particularly preferably 85% to 95% of the transition radius 8. The radius $r_S$ of the impact head 21 preferably substantially corresponds to the transition radius 8.

The impact heads 21 may basically be of any size. If multiple impact heads 21 are provided on an impact tool 16, the impact heads 21 may for example be larger than 10%, 20%, 30%, 40%, 50%, 60%, 70%, 80% or 90% of the transition radius 8. The size of an impact head 21 may however also be smaller than 10% of the size of the transition radius 8 or correspond to the size of the transition radius 8.

FIGS. 12 and 13 illustrate exemplary transition radii 8 between a main bearing journal 6 and a crank web 7, in the case of which the impact hardening has been performed at different impact angles α and in the case of which the impact impressions 28 of an impact head 21 of the impact tool 16 overlap along the transition radius 8 running in annularly encircling fashion around a main bearing journal 6. As already mentioned above, during a subsequent impact, the impact head 21 may at least partially penetrate into the impact impression 28 of the preceding impact, giving rise to the track of impact impressions 28 illustrated in the figures.

In FIGS. 12 and 13, for the purposes of the illustration in the figures, the impact impressions 28 run with a clearly visible offset with respect to one another on the circumference of the transition radius 8. The deviation is in fact preferably only small, but nevertheless effective. The offset profile may be achieved by means of a changed impact angle α, as illustrated in FIG. 11, and/or by means of a changed point of application of the impact head 21. In the case of the transition radius 8 of FIG. 12, a smaller impact angle α was selected than in the case of the transition radius 8 of FIG. 13, that is to say the spacing d between the deflection point $U_P$ of the deflecting unit 20 and the impact head 21 of the impact tool 16 was set to be greater in the case of the method as per FIG. 12 than in the case of the transition radius 8 of FIG. 13. Accordingly, the impact impressions 28 run higher up, or closer to the crank web 7, in the case of the transition radius 8 illustrated in FIG. 13 than in the case of the transition radius 8 of FIG. 12.

The tracks, illustrated in FIGS. 12 and 13, of impact impressions 28 have been formed in the exemplary embodiments through the use (not illustrated in any more detail here) of multiple impact heads 21 in each case. In the context of the invention, provision may even be made for an impact device 1 to have multiple impact tools 16, for example two impact tools 16, which have in each case one impact head 21 and which are assigned to the same transition radius 8, wherein the respective impact angle α of the impact tools 16 is set differently. It is then for example also possible to form tracks of impact impressions 28 which run parallel to one another (in overlapping or non-overlapping fashion).

Provision may also be made whereby, during the impact hardening of a transition radius 8, the impact angle α of an impact tool 16 is varied along the respective transition radius 8 running in annularly encircling fashion around the connecting-rod bearing journal 5 and/or main bearing journal 6. This is illustrated in FIG. 14 and may self-evidently be provided even if multiple impact heads 21 are assigned to the transition radius.

Provision may be made whereby all transition radii 8 between connecting-rod bearing journals 5 and the crank webs 7 are impact-hardened with a first impact angle α and all transition radii 8 between the main bearing journals 6 and the crank webs 7 are impact-hardened at a second impact angle α.

Alternatively, provision may be made whereby at least two transition radii 8 between the connecting-rod bearing journals 5 and the crank webs 7 are impact-hardened at a different impact angle α, and/or whereby at least two transition radii 8 between the main bearing journals 6 and the crank webs 7 are impact-hardened at a different impact angle α, and/or whereby at least one transition radius 8 between the connecting-rod bearing journal 5 and the crank webs 7 is impact-hardened at a different impact angle α, than a transition radius 8 between the main bearing journals 6 and the crank webs 7.

What is claimed is:

1. An apparatus for the impact-hardening of transition radii of a crankshaft, in particular of transition radii between connecting-rod bearing journals and crank webs and/or transition radii between main bearing journals and the crank webs of the crankshaft, comprising at least one impact device for introducing an impact force into at least one transition radius, wherein the impact device has multiple impact heads which are assigned to the same transition radius wherein at least two of the impact heads which are assigned to the same transition radius are arranged such that the impact heads each generate their own tracks of impact impressions during the impact hardening of a transition radius running in annularly encircling fashion around the connecting-rod bearing journal, and wherein the respective tracks of impact impressions are axially displaced to each other but partially overlap.

2. The apparatus as claimed in claim 1, wherein the impact device has an impact piston and a deflecting unit, wherein the at least one impact device is arranged at the deflecting unit, and wherein the impact piston transmits an impulse to the at least one impact device via the deflecting unit, and the one or more impact heads of the at least one impact device introduce(s) the impact force into the associated transition radius.

3. The apparatus as claimed in claim 2, further comprising a changeover device.

4. The apparatus as claimed in claim 1, in that the impact heads for the impact hardening have a spherical surface.

5. The apparatus as claimed in claim 1, wherein the impact heads have different sizes.

* * * * *